(12) United States Patent
Miyata et al.

(10) Patent No.: US 6,307,713 B1
(45) Date of Patent: *Oct. 23, 2001

(54) CENTER CORE FOR DISC-SHAPED RECORDING MEDIUM AND PROCESS OF PRODUCING SAME

(75) Inventors: Kiyoyuki Miyata; Hiroshi Meguro, both of Miyagi (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/359,256

(22) Filed: Jul. 22, 1999

(30) Foreign Application Priority Data

Jul. 24, 1998 (JP) .................................................. 10-209559

(51) Int. Cl.[7] ............................... G11B 5/82; G11B 23/03
(52) U.S. Cl. ........................................... 360/135; 360/133
(58) Field of Search .................................. 360/135, 133; 369/282, 285, 290, 291

(56) References Cited

U.S. PATENT DOCUMENTS

| 5,010,435 | * | 4/1991 | Shiba et al. ........................... 369/282 |
| 5,323,381 | * | 6/1994 | Takahashi et al. .................... 369/282 |
| 5,657,311 | * | 8/1997 | Takahashi ............................. 369/282 |
| 5,896,241 | * | 4/1999 | Hilton et al. .......................... 369/135 |
| 6,061,215 |   | 5/2000 | Tomita .................................. 360/133 |
| 6,118,633 | * | 9/2000 | Krieger et al. ........................ 369/135 |

* cited by examiner

Primary Examiner—Allen Cao
(74) Attorney, Agent, or Firm—Frommer Lawrence & Haug, LLP; William S. Frommer; Matthew K. Ryan

(57) ABSTRACT

A center core for a disc-shaped recording medium. The center core comprises a flange section for supporting the disc-shaped recording medium. A generally cylindrical section having a bottom wall is formed integral with and located radially inward of the flange section. A plurality of supportable standard sections are formed at the bottom wall of the cylindrical section by making a press working on the bottom wall of the cylindrical section in a manner to project toward the lower surface side of the center core. The supportable standard sections define a supportable surface through which the center core is placed on a turn table of a disc drive device.

5 Claims, 15 Drawing Sheets

CENTER CORE FOR DISC-SHAPED RECORDING MEDIUM AND PROCESS OF PRODUCING SAME

BACKGROUND OF THE INVENTION

1. Field of the Invention

This invention relates to improvements in a center core installed to the center portion of a disc-shaped recording medium and used for the purpose of making a so-called magnetic chucking for the disc-shaped recording medium to a turn table of a disc drive device, and additionally to a production process for the center core.

2. Description of the Prior Art

Hitherto a variety of center cores for disc-shaped recording mediums have been proposed and put into practical use. Of these center cores, one shown in FIG. 14 has been known, in which the center core 101 includes a flange section 102 for supporting a disc-shaped recording medium 201. A generally cylindrical section 103 having a bottom wall 103 is formed radially inward of the flange section 102. The cylindrical section 103 is formed at the central portion of the bottom wall with a supportable surface 104 through which the center core 101 is mounted on a turn table 401 of a disc drive device which will be shown in FIGS. 22 to 27. A projecting section 105 is formed radially outward of the supportable surface 104. A spindle shaft insertion hole 106 is formed at the central portion of the above-mentioned supportable surface 104. A drive pin engaging hole 107 is formed radially outward of the spindle shaft insertion hole 106 and located to extend throughout the supportable surface 104 and the projecting section 105 for adjusting the magnetic attraction force.

This conventional center core 101 is produced as follows:

At a first step shown in FIGS. 15A and 15B, a pilot through-hole 302 is formed at its central portion of a sheet 301 of a magnetic metal such as stainless steel or the like. Additionally, a plurality of arcuate cutouts 304 are formed along a circle (not shown) whose center corresponds to the center of the pilot through-hole 302. Accordingly, the arcuate cutouts 304 are circularly arranged in which a non-cutout or flat wall portion 303 is formed between the adjacent arcuate cutouts 304.

At a second step shown in FIGS. 16A and 16B, the flange section 102 and the cylindrical section 103 having the bottom wall are formed by making a press working on a radially inward side relative to the circularly arranged cutouts 304. The cylindrical section 103 formed projecting toward a lower surface side of the center core 201.

At a third step shown in FIGS. 17A and 17B, burring is applied to the pilot through-hole 302 thereby forming the spindle shaft insertion hole 106.

At a fourth step shown in FIGS. 18A and 18B, a drive pin engaging hole 107 is formed to be located radially between the spindle shaft insertion hole 106 and a peripheral cylindrical wall of the cylindrical section 103.

At a fifth step shown in FIGS. 19A and 19B, a press working is made on the bottom wall of the cylindrical section 103 in a direction from a lower surface side of the metal sheet 301 so as to cause a central portion of the cylindrical section 103 to project toward the upper surface side of the metal sheet 301. Accordingly, a shallow dish-shaped generally cylindrical section 104 having a top wall is formed at the central portion of the cylindrical section 103. Simultaneously, an annular projecting section 105 is formed along the outer periphery of the shallow dish-shaped cylindrical section 104 in a manner to surround the shallow dish-shaped cylindrical section 104. The projecting section 105 functions to adjust a magnetic attraction force to be applied to the center core 101.

At a sixth step shown in FIGS. 20A and 20B, the circularly arranged arcuate non-cutout portions 303 are cut out thereby separate the center core 101 from the metal sheet 301. The above-mentioned top wall of the cylindrical section 104 serves as a supportable surface 104a through which the center core 101 is mounted on the turn table.

As shown in FIGS. 21A and 21B, the cylindrical section 103 of the center core 101 is inserted into a core installation hole 201a formed at the central portion of a disc-shaped recording medium 201 in a direction from the upper surface side of the disc-shaped recording medium 201, so that the flange section 102 is placed on the upper surface of the disc-shaped recording medium 201. At this time, the flange section 102 of the center core 101 is bonded to the upper surface of the disc-shaped recording medium with an adhesive 202 thereby maintaining the central portion of the disc-shaped recording medium 201. In other words, the center core 101 is installed to the central portion of the disc-shaped recording medium 201.

As shown in FIGS. 22 and 23, the projecting section 105 for adjusting the magnetic attraction force is attracted by a magnet 402 installed to the turn table 401 of a disc driving device, in which the supportable surface 104a is positioned on a core support surface 403. At this time, a spindle shaft 404 located at the central portion of the core support surface 403 is inserted into the spindle shaft insertion hole 106, while a drive pin 405 disposed radially outward of the core support surface 403 is brought into engagement with the drive pin engagement hole 107. As a result, rotation of the turn table 401 is transmitted to the center core 101. FIG. 22 illustrates a case where the diameter of the core support surface 403 of the turn table 401 of the disc drive is formed relatively small or the minimum, while FIG. 23 illustrates a case where the diameter of the core support surface 403 is formed relatively large or the maximum.

However, the following drawbacks have been encountered in the above conventional center core 101:

(a) The supportable surface 104a is formed annular and around the spindle shaft insertion hole 106. The supportable surface 104a is adapted to be in direct contact with the core support surface 403, and therefore it is required that a whole area of the supportable surface 104a which area contacts with the core support surface 403 have a high surface precision. Accordingly, in this case, it is difficult to have the high surface precision throughout the whole area as compared with a case where only a part is required to have such a high surface precision.

(b) Although it is ideal that the supportable surface 104a is formed as a flat horizontal plane, the supportable surface 104a is in fact inclined to form an inclined generally frustoconical surface which rises in a direction of from the outer peripheral portion toward the central spindle shaft insertion hole 106 with a gentle slope, as shown in FIGS. 24 and 25. Such inclination of the supportable surface 104a is unavoidably formed under the phenomenon of springback of the metal sheet when a press working is made on the metal sheet during production of the center core 101. When the supportable surface 104a of the above inclined shape is placed on the core support surface 403 of the minimum diameter as shown in FIG. 24, the projecting section 105 for adjusting magnetic attraction force, located radially outward of the supportable surface 104a is brought into contact with the upper surface of the magnet 402 of the turn table 401. As a result, the center core 101 will float or separate upward from the core support surface 403 of the turn table 401. Otherwise, in a case where the center core 101 is placed on the core support surface 304 having the maximum diameter as shown in FIG. 25, the projecting section 105 for adjusting magnetic attraction force may be prevented from contacting with the upper surface of the magnet 402; however, a clearance δ between the projecting section 105 and the magnet 402 becomes smaller so that the magnetic attraction force obtained by the magnet 402 will change.

Besides, as shown in FIGS. 26 and 27, the disc-shaped recording medium 201 is unavoidably lowered to a level lower than a standard level indicated by a dot-dash line. As a result, a contacting force of an upper magnetic head 411 against the disc-shaped recording medium 201 becomes too weak, while a contacting force of a lower magnetic head 412 becomes too strong. Therefore, it is difficult to obtain a stable output of the disc-shaped recording medium 201. In FIGS. 26 and 27, the reference numeral 211 denotes a shell in which the disc-shaped recording medium 201 is rotatably stored.

BRIEF SUMMARY OF THE INVENTION

It is an object of the present invention to provide an improved center core for a disc-shaped recording medium, which can effectively overcome drawbacks encountered in conventional center cores for disc-shaped recording mediums.

Another object of the present invention is to provide an improved center core for a disc-shaped recording medium, which is easy in production, while providing a high surface precision or flatness to a supportable surface of the center core through which surface the center core is placed on a turn table of a disc drive device.

A further object of the present invention is to provide an improved center core for a disc-shaped recording medium, in which a high surface precision or flatness can be easily provided to a supportable surface of the center core through which surface the center core is placed on a turn table of a disc drive device, while a deformation of the center core under springback during press working can be compensated or cancelled.

An aspect of the present invention resides in a center core for a disc-shaped recording medium. The center core comprises a flange section for supporting the disc-shaped recording medium. A generally cylindrical section has a bottom wall, disposed radially inward of the flange section. A plurality of supportable standard sections are formed at the bottom wall of the cylindrical section. The supportable standard sections define a supportable surface through which the center core is placed on a turn table of a disc drive device.

Another aspect of the present invention resides in a process of producing a center core for a disc-shaped recording medium. The process comprises the following steps: (a) forming a pilot through-hole and a plurality of arcuate cutouts in a metal sheet, the cutouts being circularly arranged around the pilot through-hole so that a non-cutout portion is located between the adjacent cutouts; (b) making a press working on a part located radially inward of the circularly arranged cutouts so as to form a flange section and a generally cylindrical section having a bottom wall; (c) making burring onto the pilot through-hole so as to form a spindle shaft insertion hole; (d) forming a drive pin engagement hole located radially between the spindle shaft insertion hole and a peripheral cylindrical wall of the cylindrical section; (e) making a press working on the bottom wall of the cylindrical section to form a shallow dish-shaped generally cylindrical section having a top wall, the shallow dish-shaped generally cylindrical section projecting in a direction of an upper surface side of the metal sheet; (f) making a press working on the top wall of the shallow dish-shaped cylindrical section so as to form a plurality of supportable standard sections which projects in a direction of a lower surface side of the metal sheet, the supportable standard sections defining a supportable surface through which the center core is supportable on a turn table of a disc drive device; and (g) cutting out the non-cutout portions each located between the adjacent cutouts.

According to the present invention, the supportable surface of the center core is defined by the lower surfaces of the plurality of the supportable standard sections, and therefore the high surface precision or flatness of the supportable surface can be readily provided as compared with a case where the supportable surface is defined by a flat surface of the conventional center core. Additionally, the supportable standard sections can be easily formed by making a press working on the central part of the center core in a manner to project toward the back surface side of the center core. These projected supportable standard sections can compensate a deformation of the center core caused by springback during making the press working.

DETAILED DESCRIPTION OF THE INVENTION

Figure 1:
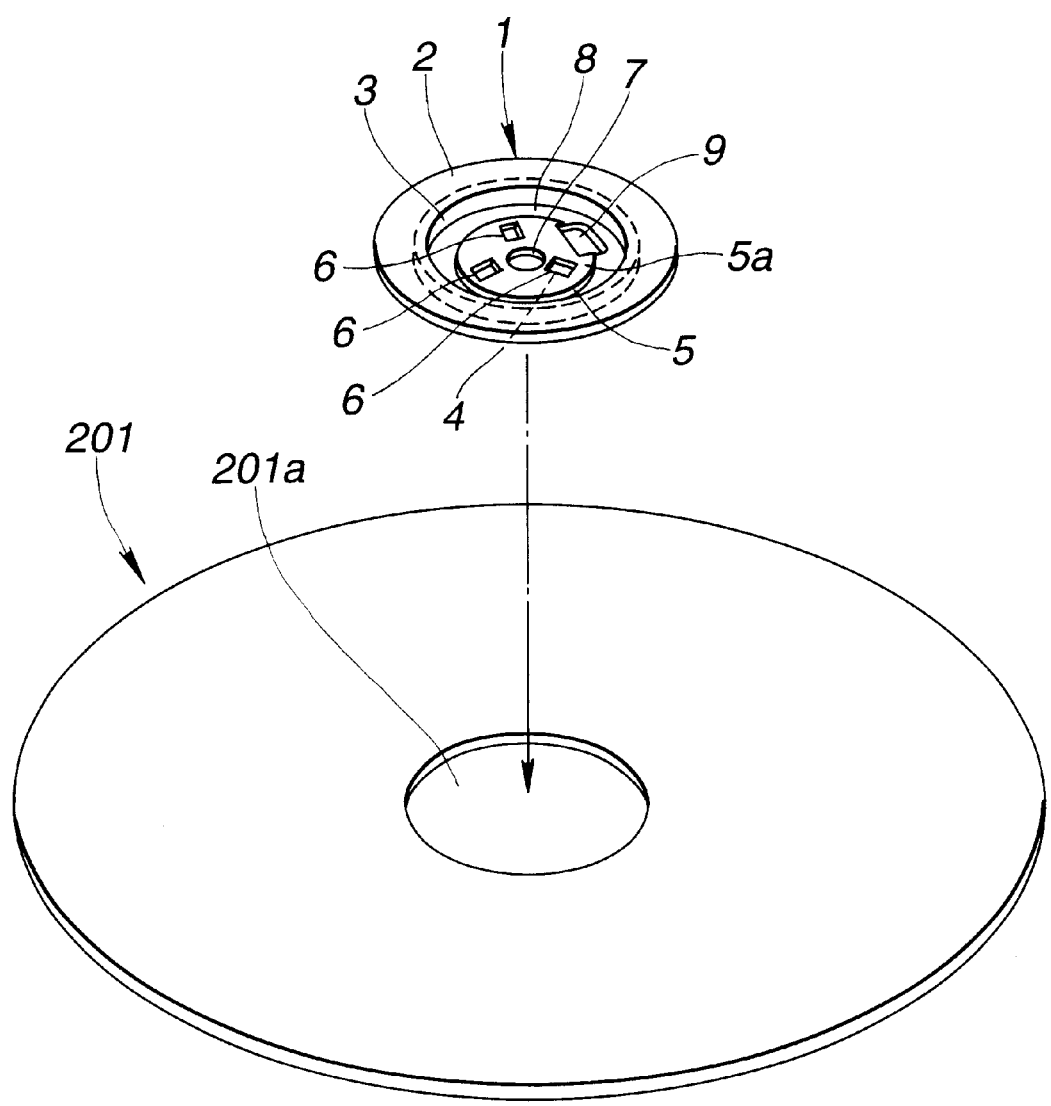
FIG. 1 is an exploded perspective view of an assembly of a disc-shaped recording medium and an embodiment of a center core according to the present invention.

Referring now to FIG. 1 of the drawings, an embodiment of a center core for a disc-shaped recording medium, according to the present invention is illustrated by the reference numeral 1. The center core 1 comprises a flange section 2 adapted to support the disc-shaped recording medium 201. A generally cylindrical section 3 with a bottom wall is formed radially inward of the flange section 2 and integral with the flange section 2. A supportable surface 4 is formed in the bottom wall of the cylindrical section 3.

The supportable surface 4 is defined by surfaces of three supportable standard sections 6 which are formed in a shallow dish-shaped generally cylindrical section 5. The cylindrical section 5 is formed in the bottom wall of the cylindrical section 3 so as to project toward an upper surface side of the center core 1. The three supportable standard sections 6 extend radially and have respective axes (not shown) located at intervals of about 120° in peripheral angle. A spindle shaft insertion hole 7 is formed at a central portion of the bottom wall 5a of the cylindrical section 5. A center axis (not identified) of the center core 1 generally corresponds to the center axis of the spindle shaft insertion hole 7. An annular projecting section 8 is formed radially outward of the supportable standard sections 6 so as to function to adjust a magnetic attraction force to be applied to the center core 1. The annular projecting section 8 projects over the supportable standard section 6 in a direction toward the lower surface side of the center core 1. The annular projecting section 8 for adjusting magnetic attraction force is formed with a drive pin engagement hole 9 which extends to the bottom wall 5a of the shallow dish-shaped cylindrical section 5.

Figure 2:
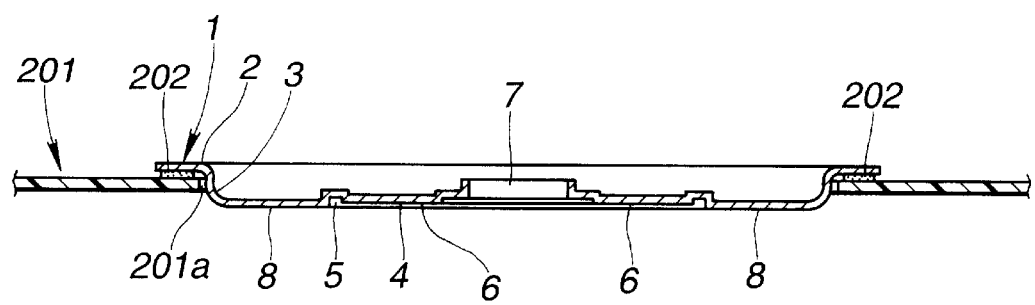
FIG. 2 is a fragmentary sectional view of the assembly of FIG. 1.

As shown in FIG. 1, the cylindrical section 3 of the center core 1 is inserted into a core installation hole 201a formed at the central portion of a disc-shaped recording medium 201 in a direction from the upper surface side of the disc-shaped recording medium 201, so that the flange section 2 is placed on the upper surface of the disc-shaped recording medium 201. At this time, the flange section 2 of the center core 1 is bonded to the upper surface of the disc-shaped recording medium with an adhesive 202, as shown in FIG. 2. Thus, the center core 1 is installed to the central portion of the disc-shaped recording medium 201.

Figure 3:
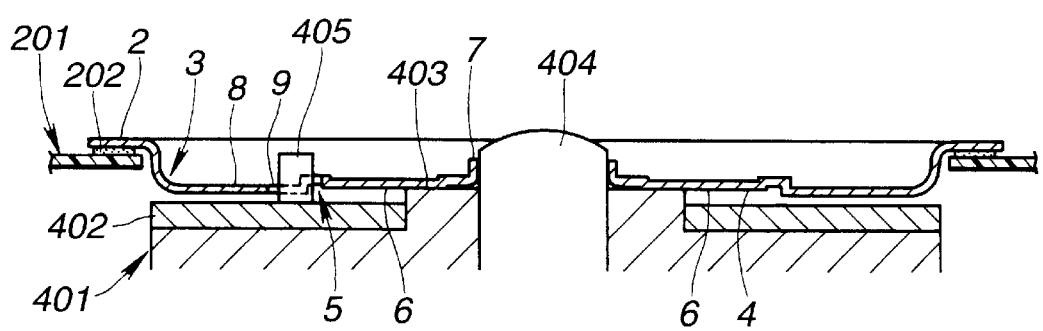
FIG. 3 is a fragmentary sectional view similar to FIG. 2, showing an ideal condition where the center core is chucked on a turn table having a small diameter core support surface.
Figure 4:
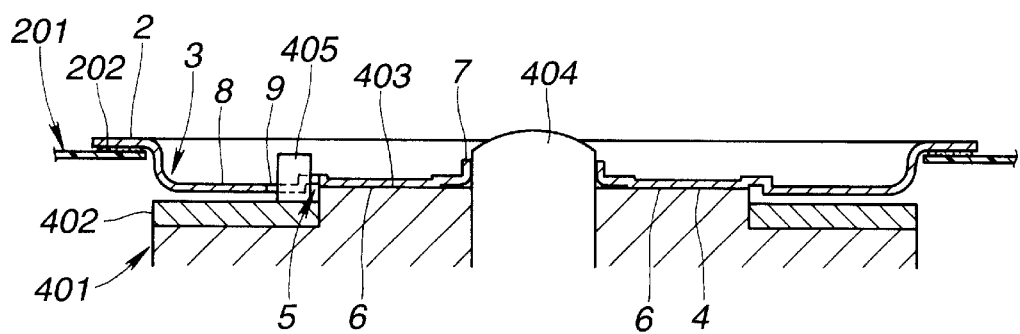
FIG. 4 is a fragmentary sectional view similar to FIG. 3, showing an ideal condition where the center core is chucked on a turn table having a large diameter core support surface.

As shown in FIGS. 3 and 4, the projecting section 8 for adjusting the magnetic attraction force is attracted by a magnet 402 installed to a turn table 401 of a disc drive device, in which the supportable surface 4 defined by the three supportable standard sections 6 is positioned on a core support surface 403. At this time, a spindle shaft 404 located at the central portion of the core support surface 403 is inserted into the spindle shaft insertion hole 7, while a drive pin 405 disposed radially outward of the core support surface 403 is brought into engagement with the drive pin engagement hole 9. As a result, rotation of the turn table 401 is transmitted to the center core 1. FIG. 3 illustrates a case where the diameter of the core support surface 403 of the turn table 401 of the disc drive device is formed relatively small or the minimum, while FIG. 4 illustrates a case where the diameter of the core support surface 403 is formed relatively large or the maximum.

A process of production of the center core 101 will be discussed with reference to FIGS. 5A to 11B.

Figure 5A:
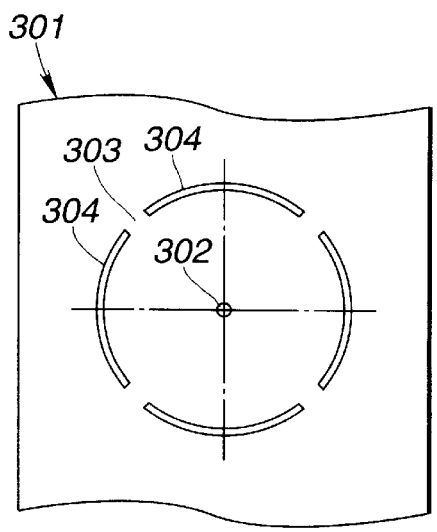
FIG. 5A is a fragmentary plan view of a metal sheet, showing a first step of a production process of the center core of FIG. 1.
Figure 5B:
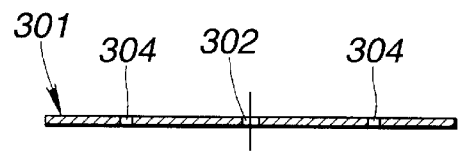
FIG. 5B is a sectional view of the metal sheet of FIG. 5A.

At a first step shown in FIGS. 5A and 5B, a pilot through-hole 302 is formed at its central portion of a sheet 301 of a magnetic metal such as stainless steel or the like. Additionally, a plurality of arcuate cutouts 304 are formed along a circle (not shown) whose center corresponds to the center of the pilot through-hole 302. Accordingly, the arcuate cutouts 304 are circularly arranged in which a non-cutout or flat wall portion 303 is formed between the adjacent arcuate cutouts 304.

Figure 6A:
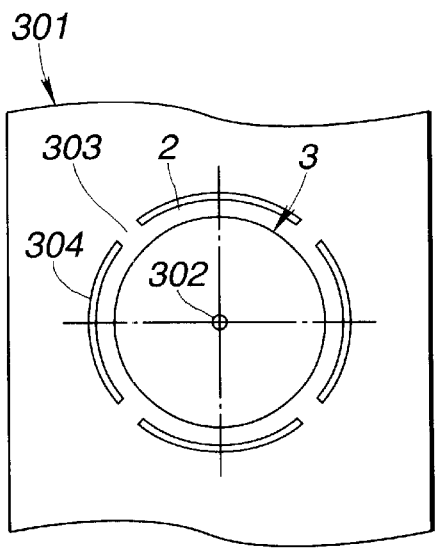
FIG. 6A is a fragmentary plan view of the metal sheet, showing a second step of the production process of the center core of FIG. 1.
Figure 6B:
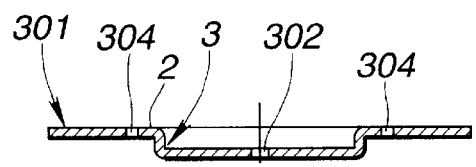
FIG. 6B is a sectional view of the metal sheet of FIG. 6A.

At a second step shown in FIGS. 6A and 6B, the flange section 2 and the cylindrical section 3 having the bottom wall are formed by making a press working on the surface of the magnetic metal sheet 301 at a radially inward side relative to the circularly arranged cutouts 304. The cylindrical section 3 formed projecting toward a lower surface side of the flange section 2.

Figure 7A:
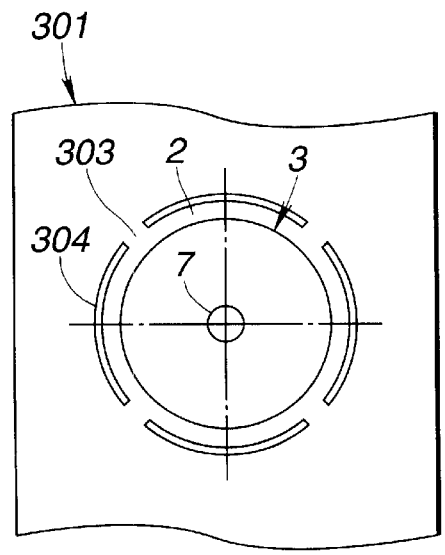
FIG. 7A is a fragmentary plan view of the metal sheet, showing a third step of the production process of the center core of FIG. 1.
Figure 7B:
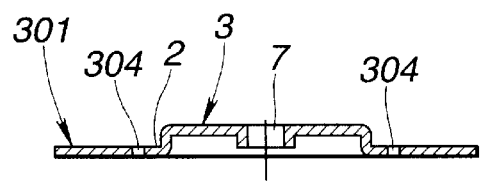
FIG. 7B is a sectional view of the metal sheet of FIG. 7A.

At a third step shown in FIGS. 7A and 7B, burring is applied to the pilot through-hole 302 thereby forming the spindle shaft insertion hole 7.

Figure 8A:
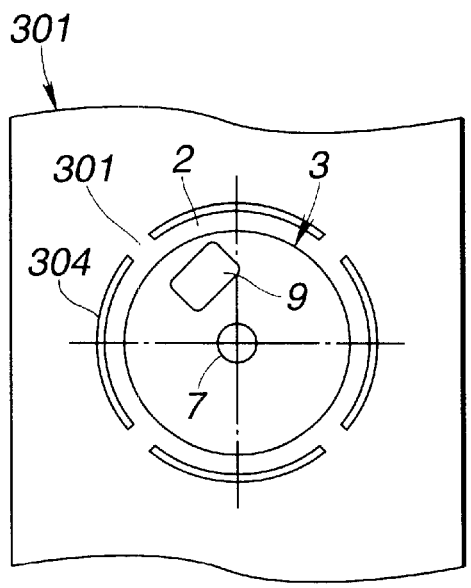
FIG. 8A is a fragmentary plan view of the metal sheet, showing a fourth step of the production process of the center core of FIG. 1.
Figure 8B:
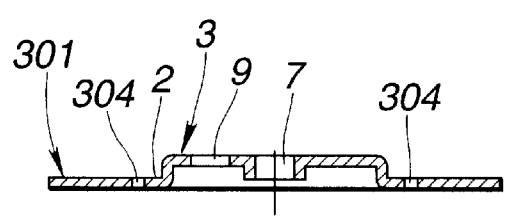
FIG. 8B is a sectional view of the metal sheet of FIG. 8A.

At a fourth step shown in FIGS. 8A and 8B, a drive pin engaging hole 9 is formed to be located radially between the spindle shaft insertion hole 7 and a peripheral cylindrical wall of the cylindrical section 3.

Figure 9A:
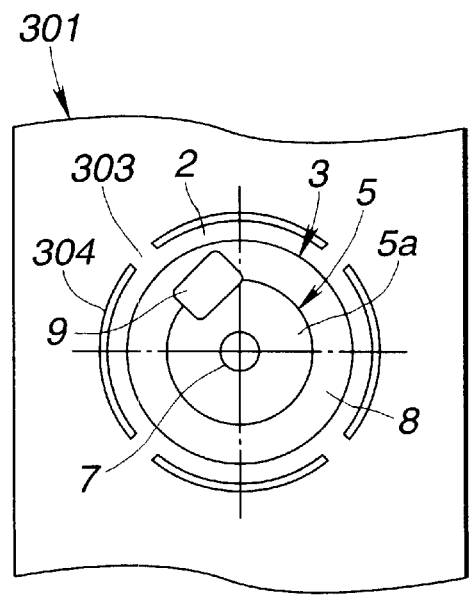
FIG. 9A is a fragmentary plan view of the metal sheet, showing a fifth step of the production process of the center core of FIG. 1.
Figure 9B:
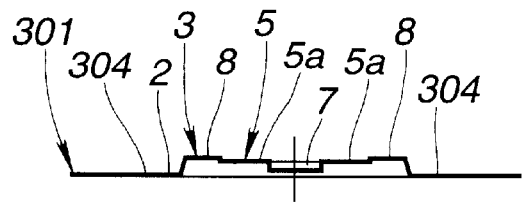
FIG. 9B is a sectional view of the metal sheet of FIG. 9A.

At a fifth step shown in FIGS. 9A and 9B, a press working is made on the bottom wall of the cylindrical section 3 in a direction from a lower surface side of the metal sheet 301 so as to cause a central portion of the cylindrical section 3 to project toward the upper surface side of the metal sheet 301. Accordingly, a shallow dish-shaped generally cylindrical section 5 having a top wall 5a is formed at the central portion of the cylindrical section 3. Simultaneously, an annular projecting section 8 is formed along the outer periphery of the shallow dish-shaped cylindrical section 5 in a manner to surround the shallow dish-shaped cylindrical section 5. The projecting section 8 functions to adjust a magnetic attraction force to be applied to the center core 1.

Figure 10A:
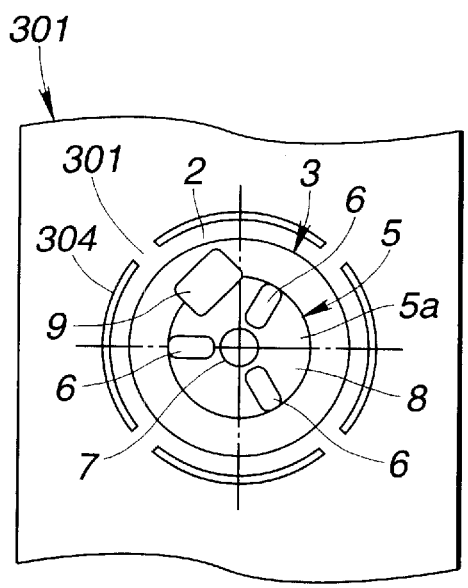
FIG. 10A is a fragmentary plan view of the metal sheet, showing a sixth step of the production process of the center core of FIG. 1.
Figure 10B:
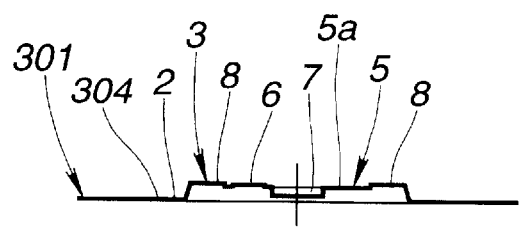
FIG. 10B is a sectional view of the metal sheet of FIG. 10A.

At a sixth step shown in FIGS. 10A and 10B, a press working is made on the top wall 5a of the shallow dish-shaped cylindrical section 5 in a direction from the upper surface side of the metal sheet 301 so as to cause parts of the top wall 5a to project toward the lower surface side of the metal sheet 301. Accordingly, three supportable standard sections 6 are formed at the top wall 5a of the shallow dish-shaped cylindrical section 5 in a manner to project toward the lower surface side of the metal sheet 301. Each supportable standard section 6 extends in a radial direction. These supportable standard sections 6 form the supportable surface 4.

Figure 11A:
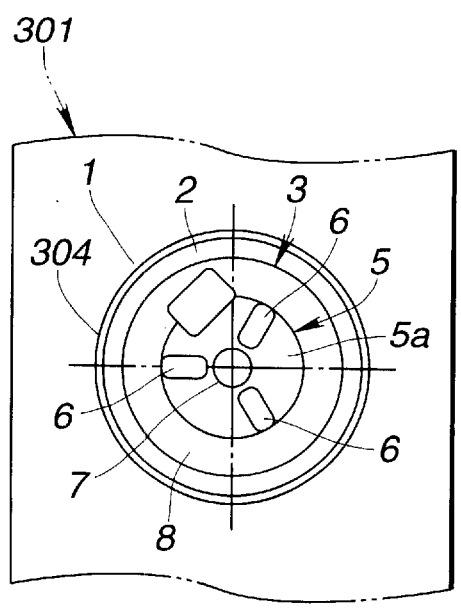
FIG. 11A is a fragmentary plan view of the metal sheet, showing a seventh step of the production process of the center core of FIG. 1.
Figure 11B:
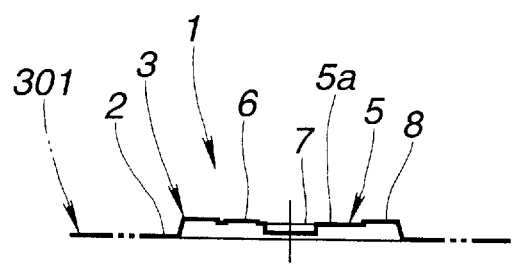
FIG. 11B is a sectional view of the metal sheet of FIG. 11A.

At a seventh step shown in FIGS. 11A and 11B, the circularly arranged arcuate non-cutout portions 303 are cut out thereby separate the center core 101 from the metal sheet 301.

In the above sixth step shown in FIG. 10, the projecting amounts at the radially inward and outward portions of each supportable standard section 6 are so adjusted that the supportable surface 4 of the center core 1 is generally horizontal.

Figure 25:
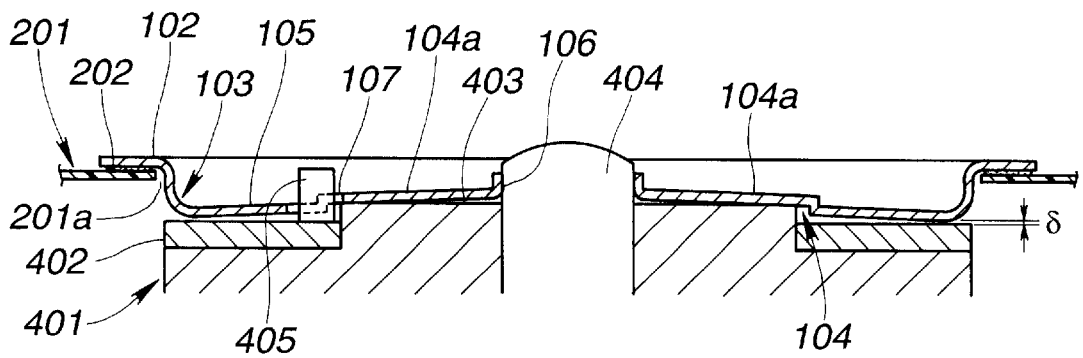
FIG. 25 is a fragmentary sectional view similar to FIG. 23, showing an actual problematic condition where the conventional center core is chucked on a turn table having a large diameter core support surface.
Figure 26:
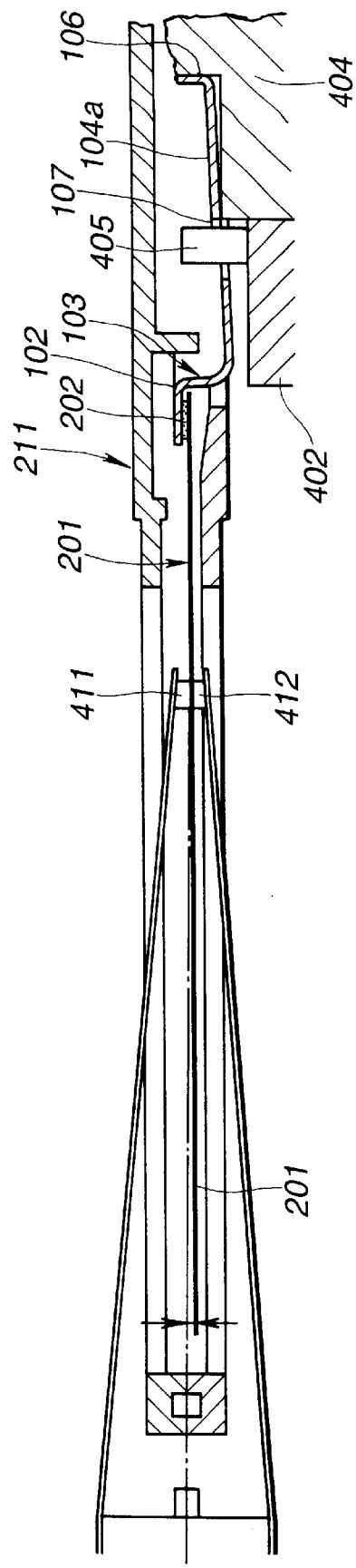
FIG. 26 is a fragmentary sectional view of a disc drive device, showing a problematic used state of the assembly including the conventional center core, under a condition where the conventional core is placed on the turn table having the large diameter core.
Figure 27:
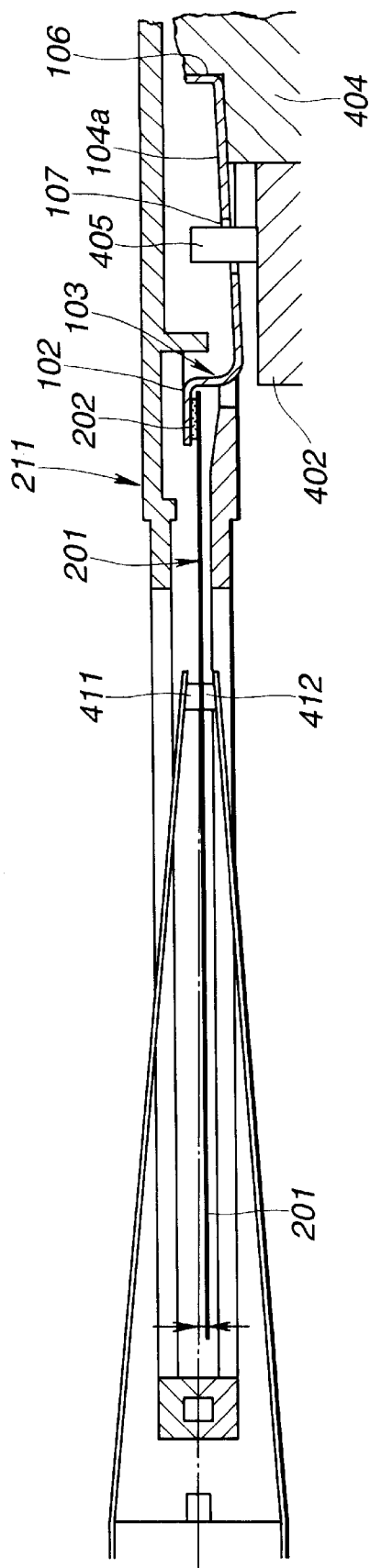
FIG. 27 is a fragmentary sectional view of a disc drive device, showing a problematic used state of the assembly including the conventional center core, under a condition where the conventional core is placed on the turn table having the small diameter core.

According to the above embodiment of the center core 1, a generally frustoconical deformation of the radially inner part of the center core 1 under the phenomenon of springback (as shown in FIG. 25) can be compensated by forming the three radially extending supportable standard sections 6 upon making the press working on the metal sheet 301 from the upper surface side of the metal sheet 301. By virtue of the three supportable standard sections 6 which project toward the lower surface side of the center core 1, the supportable surface 4 which is high in surface precision or flatness can be easily obtained.

Figure 12:
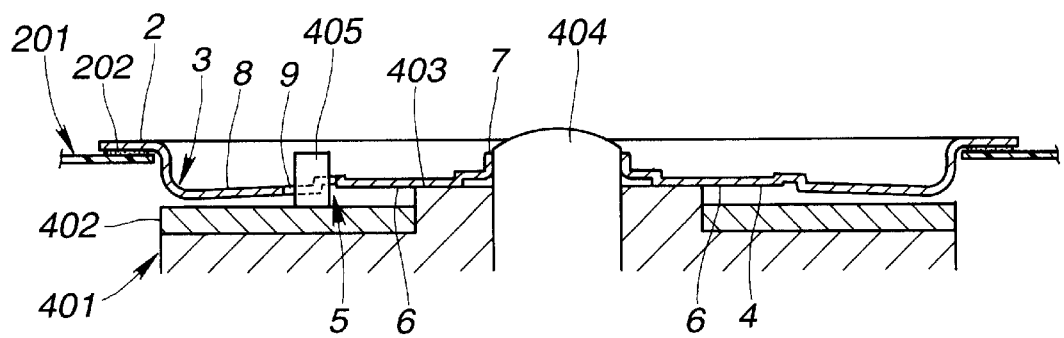
FIG. 12 is a fragmentary sectional view similar to FIG. 3, showing an actual condition where the center core is chucked on a turn table having a small diameter core support surface.
Figure 13:
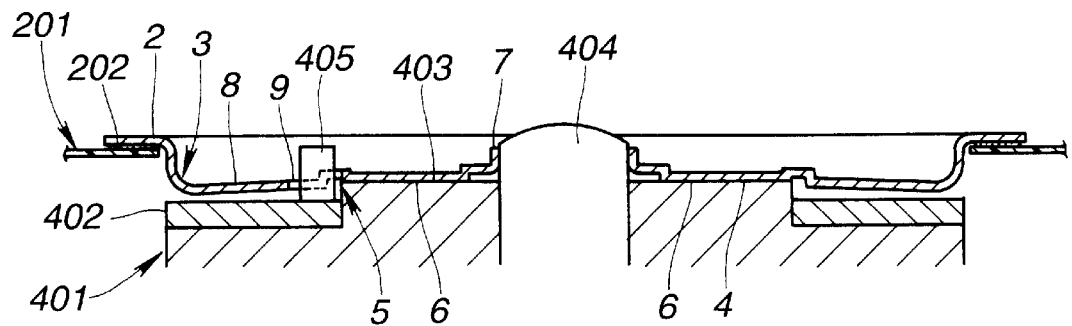
FIG. 13 is a fragmentary sectional view similar to FIG. 4, showing an actual condition where the center core is chucked on a turn table having a large diameter core support surface.
Figure 14:
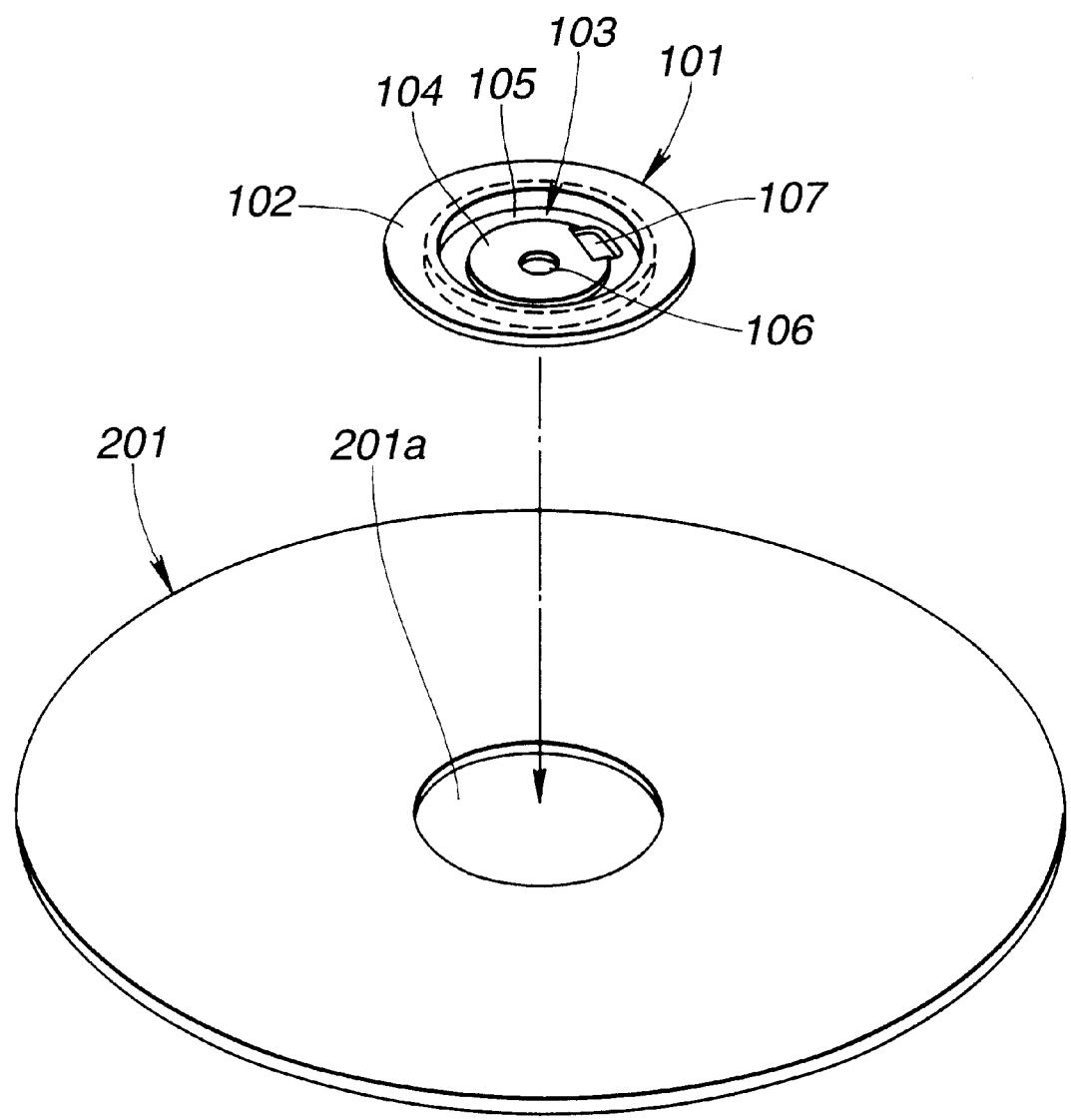
FIG. 14 is an exploded perspective view of an assembly of a disc-shaped recording medium and a conventional center core.
Figure 15A:
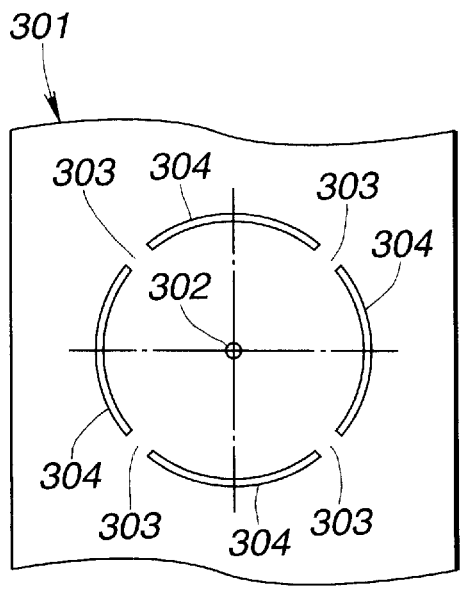
FIG. 15A is a fragmentary plan view of a metal sheet for the conventional center core of FIG. 14, showing a first step of a production process of the center core of FIG. 14.
Figure 15B:
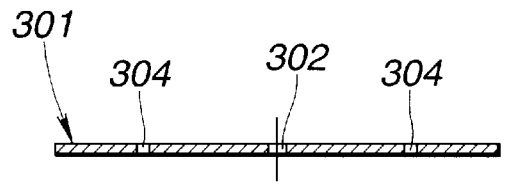
FIG. 15B is a sectional view of the metal sheet of FIG. 15A.
Figure 16A:
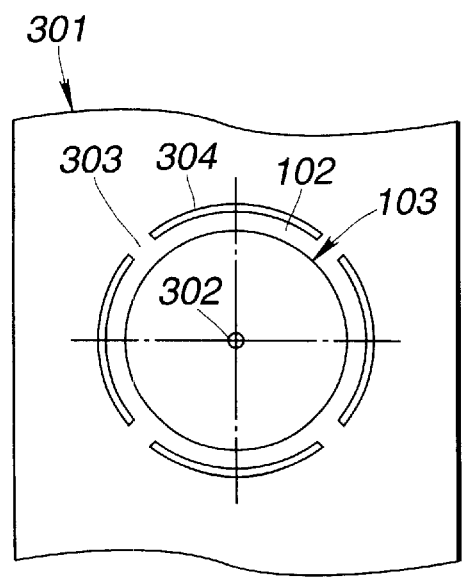
FIG. 16A is a fragmentary plan view of the metal sheet for the conventional center core of FIG. 14, showing a second step of the production process of the center core of FIG. 14.
Figure 16B:
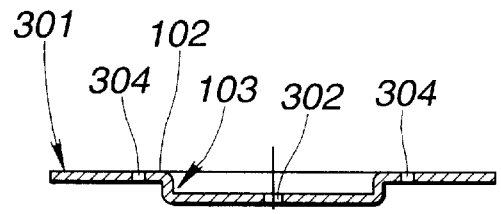
FIG. 16B is a sectional view of the metal sheet of FIG. 16A.
Figure 17A:
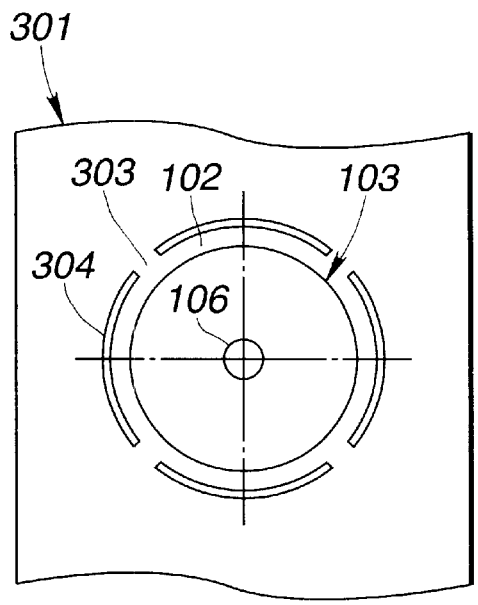
FIG. 17A is a fragmentary plan view of the metal sheet for the conventional center core of FIG. 14, showing a third step of the production process of the center core of FIG. 14.
Figure 17B:
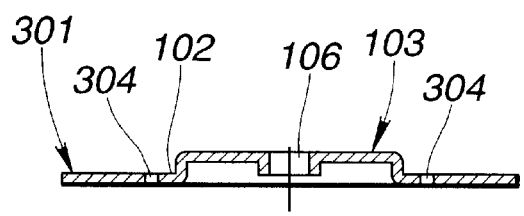
FIG. 17B is a sectional view of the metal sheet of FIG. 17A.
Figure 18A:
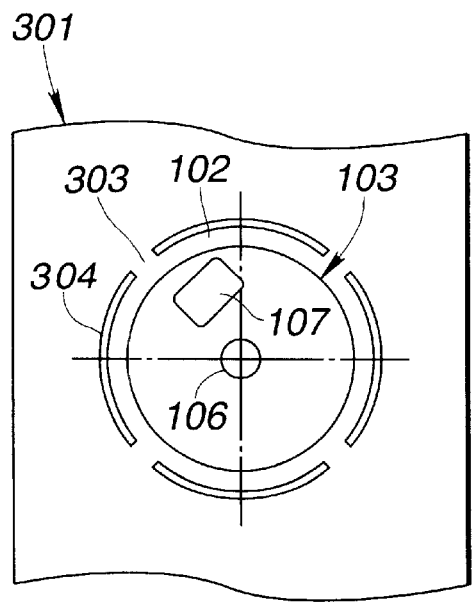
FIG. 18A is a fragmentary plan view of the metal sheet for the conventional center core of FIG. 14, showing a fourth step of the production process of the center core of FIG. 14.
Figure 18B:
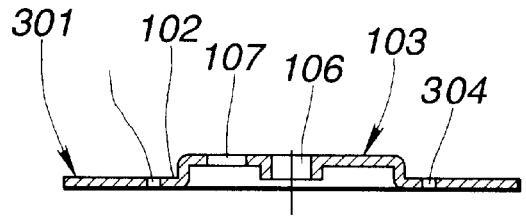
FIG. 18B is a sectional view of the metal sheet of FIG. 18A.
Figure 19A:
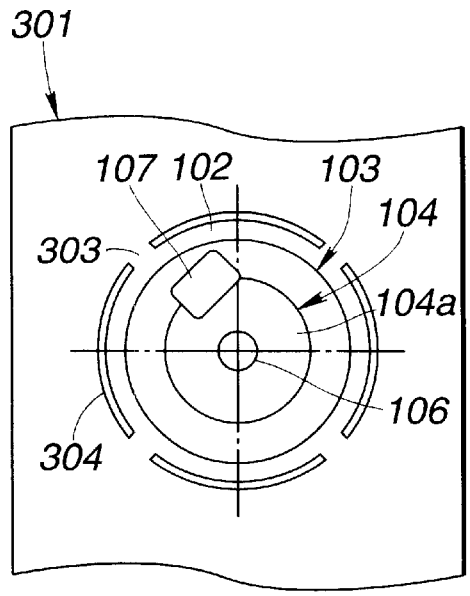
FIG. 19A is a fragmentary plan view of the metal sheet for the conventional center core of FIG. 14, showing a fifth step of the production process of the center core of FIG. 14.
Figure 19B:
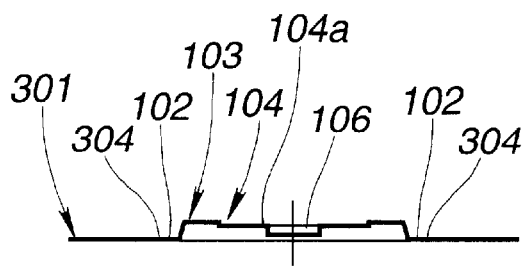
FIG. 19B is a sectional view of the metal sheet of FIG. 19A.
Figure 20A:
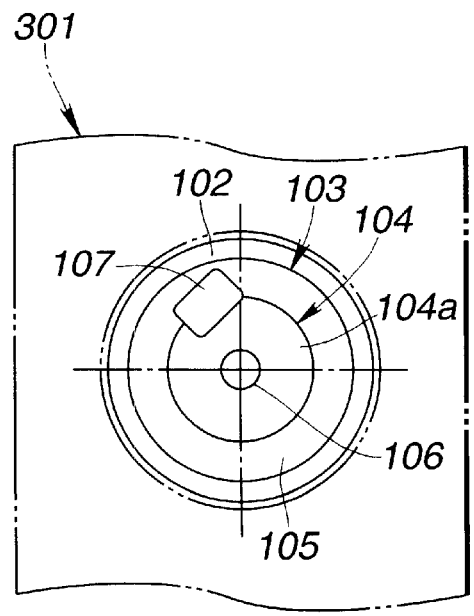
FIG. 20A is a fragmentary plan view of the metal sheet for the conventional center core of FIG. 14, showing a sixth step of the production process of the center core of FIG. 14.
Figure 20B:
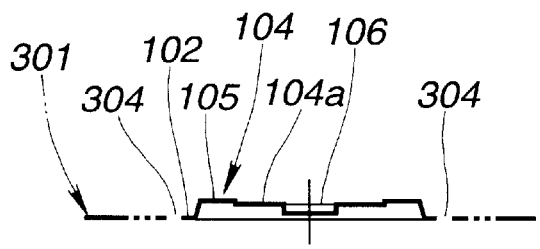
FIG. 20B is a sectional view of the metal sheet of FIG. 20A.
Figure 21:
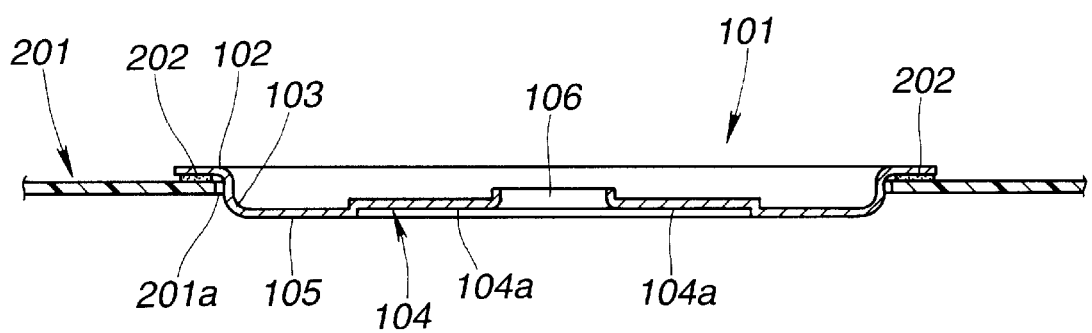
FIG. 21 is a fragmentary sectional view of the assembly of FIG. 14 including the conventional center core.
Figure 22:
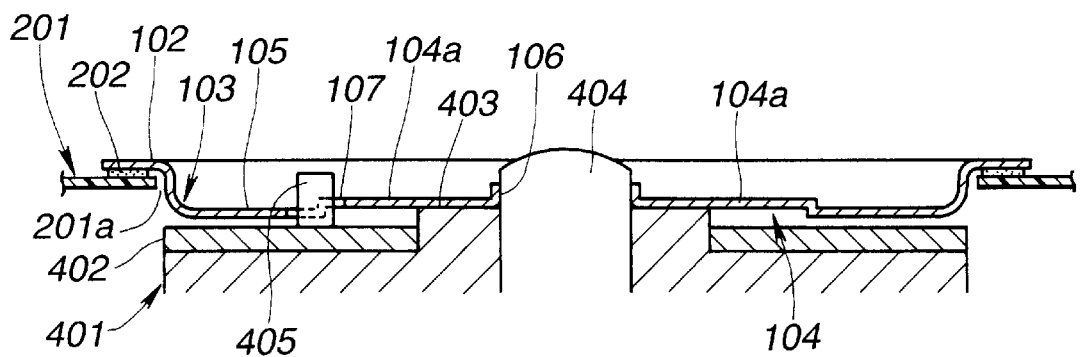
FIG. 22 is a fragmentary sectional view similar to FIG. 21, showing an ideal condition where the conventional center core is chucked on a turn table having a small diameter core support surface.
Figure 23:
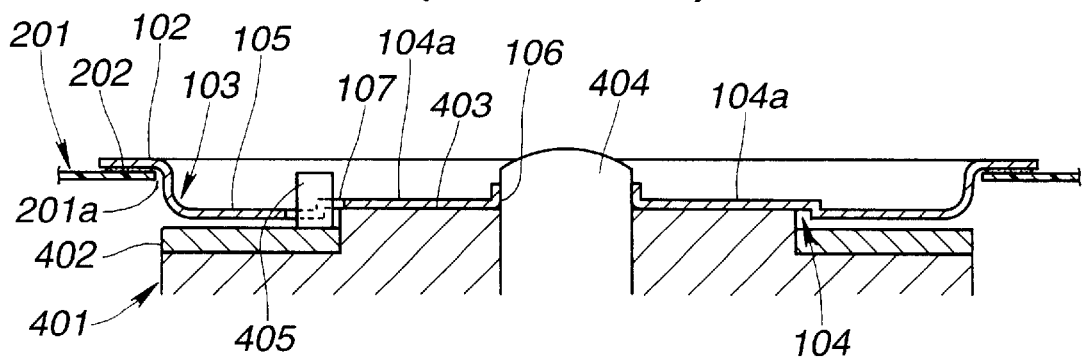
FIG. 23 is a fragmentary sectional view similar to FIG. 22, showing an ideal condition where the conventional center core is chucked on a turn table having a large diameter core support surface.
Figure 24:
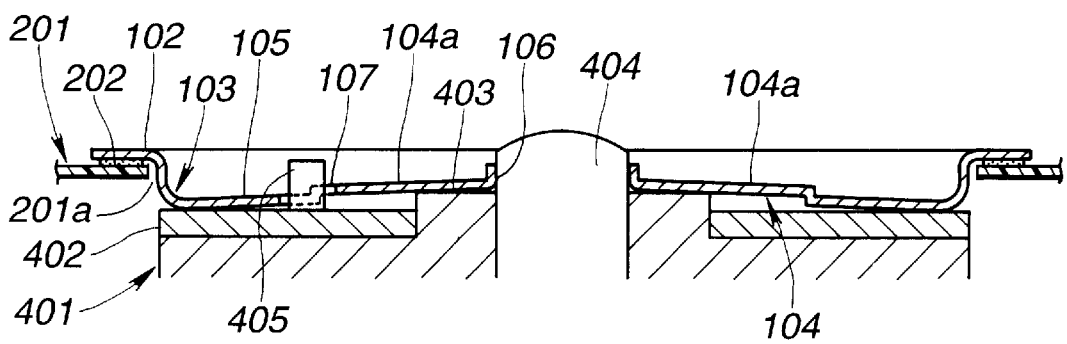
FIG. 24 is a fragmentary sectional view similar to FIG. 22, showing an actual problematic condition where the conventional center core is chucked on a turn table having a small diameter core support surface.

Accordingly, the center core 1 can be prevented from inclining thereby making it possible to support the center core 1 on the core support surface 403 in a state similar to an ideal state shown in FIGS. 3 and 4, even in a case where the center core 1 is placed on the core support surface 403 having a small or the minimum diameter as shown in FIG. 12, or even in a case where the center core 1 is placed on the core support surface 403 having a large or the maximum diameter.

It will be understood that the center core 1 of the present invention can be used for a recording medium of a floppy disc or a MO (magneto-optic) disc, or for other recording mediums.

What is claimed is:

1. A center core for a disc-shaped recording medium, comprising:
    a flange section for supporting the disc-shaped recording medium;
    a generally cylindrical section having a bottom wall, disposed radially inward of said flange section; and
    a plurality of separated supportable standard sections formed at the bottom wall of said cylindrical section so as to extend radially and have respective axes located at intervals of about 120° in peripheral angle, said supportable standard sections defining a generally flat supportable surface by which said center core is placed on a turntable of a disc drive device.

2. A center core as claimed in claim 1, wherein said supportable standard sections are formed projecting from a bottom surface of the bottom wall of said cylindrical section, each supportable standard section formed radially extending.

3. A center core as claimed in claim 1, where said supportable standard sections are formed by making a press working onto the bottom wall of said cylindrical section.

4. A center core as claimed in claim 1, further comprising an annular projecting section for adjusting a magnetic attraction force applied to said center core, said projecting section being located radially outward of said supportable surface defined by said supportable standard sections, said projecting section projecting toward a lower surface side of said center core.

5. A process of producing a center core for a disc-shaped recording medium, said process comprises the following steps:
    forming a pilot through-hole and a plurality or arcuate cutouts in a metal sheet, said cutouts being circularly arranged around said pilot through-hole so that a non-cutout portion is located between said adjacent cutouts;
    press working a part located radially inward of said circularly arranged cutouts so as to form a flange section and a generally cylindrical section having a bottom wall;

burring said pilot through-hole so as to form a spindle shaft insertion hole:

forming a drive pin engagement hole located radially between said spindle shaft insertion hole and a peripheral cylindrical wall of said cylindrical section;

press working the bottom wall of said cylindrical section to form a shallow dish-shaped generally cylindrical section having a top wall, said shallow dish-shaped generally cylindrical section projecting in a direction of an upper surface side of said metal sheet;

press working the top wall of said shallow dish-shaped cylindrical section so as to form a plurality of radially extending and separated supportable standard sections which project in a direction of a lower surface side of said metal sheet which extend radially and have respective axes located at intervals of about 120° in peripheral angle, said supportable standard sections defining a generally flat supportable surface by which said center core is supportable on a turntable of a disc drive device; and cutting out said non-cutout portions each located between said adjacent cutouts.

* * * * *